United States Patent
Sandretto et al.

(10) Patent No.: US 11,221,403 B2
(45) Date of Patent: Jan. 11, 2022

(54) IMPACT DETECTION DEVICES AND METHODS

(71) Applicant: NAVICO HOLDING AS, Egersund (NO)

(72) Inventors: Peter Sandretto, Tulsa, OK (US); Guy Coonts, Ripley, OK (US); Barry M. Antao, Owasso, OK (US)

(73) Assignee: NAVICO HOLDING AS, Egersund (NO)

( * ) Notice: Subject to any disclaimer, the term of this patent is extended or adjusted under 35 U.S.C. 154(b) by 454 days.

(21) Appl. No.: 15/963,209

(22) Filed: May 21, 2018

(65) Prior Publication Data
US 2019/0353763 A1    Nov. 21, 2019

(51) Int. Cl.
H04B 17/00    (2015.01)
G01S 7/52     (2006.01)
G08B 5/22     (2006.01)
G01S 15/89    (2006.01)

(52) U.S. Cl.
CPC ......... G01S 7/52004 (2013.01); G01S 15/89 (2013.01); G08B 5/22 (2013.01)

(58) Field of Classification Search
None
See application file for complete search history.

(56) References Cited

U.S. PATENT DOCUMENTS

| | | | | | |
|---|---|---|---|---|---|
| 3,119,189 A | * | 1/1964 | Hyne | ...... | G01S 3/801 367/106 |
| 3,176,262 A | * | 3/1965 | Ehrlich | ...... | G01S 15/42 367/98 |
| 3,178,679 A | * | 4/1965 | Wilkinson | ...... | H01Q 3/34 367/12 |
| 3,304,534 A | * | 2/1967 | Sykes | ...... | G01H 11/08 367/157 |
| 3,451,039 A | * | 6/1969 | David | ...... | G01S 3/8038 367/132 |
| 3,706,925 A | * | 12/1972 | Engelhardt | ...... | G01S 3/8083 363/26 |
| 3,877,314 A | * | 4/1975 | Bernin | ...... | G01P 15/0891 73/1.38 |

(Continued)

FOREIGN PATENT DOCUMENTS

| KR | 101235248 B1 | 2/2013 |
|---|---|---|
| KR | 20140115684 A * | 10/2014 |
| KR | 101809602 B1 | 12/2017 |

OTHER PUBLICATIONS

Kumar, Varun, et al. "A 3-bit digitally operated MEMS rotational accelerometer." 2017 IEEE 30th International Conference on Micro Electro Mechanical Systems (MEMS). IEEE, 2017. (Year: 2017).*

(Continued)

Primary Examiner — Yuqing Xiao
Assistant Examiner — Jonathan D Armstrong
(74) Attorney, Agent, or Firm — Nelson Mullins Riley & Scarbourough LLP

(57) ABSTRACT

A impact detection system is provided which includes a user interface comprising a display, processor, and memory. The memory includes computer program code configured to cause an electronic device to receive impact detection data from at least one impact detection device and generate one or more notifications based on the impact detection data.

17 Claims, 10 Drawing Sheets

(56) References Cited

U.S. PATENT DOCUMENTS

| | | | | |
|---|---|---|---|---|
| 4,052,693 | A * | 10/1977 | Gilmour | G01S 15/88 367/103 |
| 5,214,744 | A | 5/1993 | Schweizer et al. | |
| 5,321,667 | A | 6/1994 | Audi et al. | |
| 5,954,551 | A | 9/1999 | King | |
| 6,106,038 | A * | 8/2000 | Dreher | B60R 19/205 293/107 |
| 6,122,538 | A * | 9/2000 | Sliwa, Jr. | A61B 8/00 324/207.14 |
| 6,226,227 | B1 * | 5/2001 | Lent | G01S 7/6236 367/104 |
| 7,355,924 | B2 * | 4/2008 | Zimmerman | G01S 7/52003 367/131 |
| 7,457,197 | B1 * | 11/2008 | Parsons | G01S 3/801 367/106 |
| 7,652,952 | B2 * | 1/2010 | Betts | G01S 7/521 367/88 |
| 7,961,552 | B2 * | 6/2011 | Boucher | G10K 11/006 367/173 |
| 9,739,884 | B2 | 8/2017 | Proctor et al. | |
| 9,767,625 | B1 | 9/2017 | Snyder et al. | |
| 10,034,066 | B2 * | 7/2018 | Tran | G06F 3/017 |
| 10,112,700 | B1 * | 10/2018 | Birch | B64C 25/10 |
| 10,246,183 | B1 * | 4/2019 | Saunders | B64C 39/024 |
| 10,717,509 | B2 | 7/2020 | Schroeder | |
| 2002/0013106 | A1 * | 1/2002 | Healey | G01S 7/521 440/6 |
| 2005/0247251 | A1 * | 11/2005 | Seism | B63B 1/16 114/272 |
| 2005/0265123 | A1 | 12/2005 | Pope | |
| 2006/0043712 | A1 * | 3/2006 | Hakki | B60R 19/205 280/735 |
| 2008/0239869 | A1 * | 10/2008 | Lohrmann | G01S 15/588 367/3 |
| 2009/0238042 | A1 * | 9/2009 | Hawkinson | G01S 15/06 367/89 |
| 2010/0061187 | A1 * | 3/2010 | Sodal | G01V 1/001 367/131 |
| 2010/0291816 | A1 * | 11/2010 | Arvidsson | B63B 43/18 440/56 |
| 2011/0054784 | A1 | 3/2011 | Wood et al. | |
| 2013/0197747 | A1 * | 8/2013 | Tourin | F01D 21/04 701/34.4 |
| 2014/0010042 | A1 | 1/2014 | Thomas | |
| 2014/0022864 | A1 * | 1/2014 | Lebedev | G01S 7/003 367/107 |
| 2014/0071167 | A1 | 3/2014 | Lauenstein et al. | |
| 2014/0107489 | A1 * | 4/2014 | Fearnot | A61B 8/12 600/463 |
| 2015/0006038 | A1 * | 1/2015 | Gustavsson | H02P 25/032 701/45 |
| 2015/0085602 | A1 * | 3/2015 | Lebedev | G01S 7/003 367/3 |
| 2015/0355012 | A1 * | 12/2015 | Gurumohan | H04Q 9/00 702/55 |
| 2015/0369908 | A1 | 12/2015 | Zimmerman et al. | |
| 2016/0125739 | A1 * | 5/2016 | Stewart | G01C 21/203 701/21 |
| 2016/0162145 | A1 * | 6/2016 | Rivers | G01C 21/12 715/769 |
| 2016/0259520 | A1 * | 9/2016 | Gatland | G06F 3/04883 |
| 2016/0320484 | A1 * | 11/2016 | Lanham | B63C 11/48 |
| 2016/0341827 | A1 | 11/2016 | Horner et al. | |
| 2016/0362164 | A1 * | 12/2016 | Page | B63B 49/00 |
| 2017/0003865 | A1 * | 1/2017 | Gatland | G06F 3/0481 |
| 2017/0090021 | A1 * | 3/2017 | Sayer | G01S 15/88 |
| 2017/0146642 | A1 * | 5/2017 | Stokes | G01S 7/6218 |
| 2017/0219703 | A1 | 8/2017 | Proctor et al. | |
| 2017/0227639 | A1 * | 8/2017 | Stokes | G01S 7/6272 |
| 2017/0285134 | A1 * | 10/2017 | Stokes | G01S 7/6263 |
| 2017/0285167 | A1 | 10/2017 | Proctor et al. | |
| 2017/0299703 | A1 * | 10/2017 | Stokes | G01S 7/52077 |
| 2017/0315020 | A1 * | 11/2017 | Seminel | B64D 25/00 |
| 2018/0100922 | A1 | 4/2018 | Wigh et al. | |
| 2018/0164434 | A1 * | 6/2018 | Stokes | G01S 15/89 |
| 2018/0165870 | A1 * | 6/2018 | Stokes | G06T 15/08 |
| 2018/0217256 | A1 * | 8/2018 | Stokes | G01K 13/02 |
| 2018/0217257 | A1 * | 8/2018 | Murphy | A01K 97/125 |
| 2018/0259338 | A1 * | 9/2018 | Stokes | G01C 21/203 |
| 2018/0313953 | A1 * | 11/2018 | Gatland | G01S 7/6272 |
| 2018/0329056 | A1 | 11/2018 | Smith et al. | |
| 2019/0072951 | A1 | 3/2019 | Clark et al. | |
| 2019/0120959 | A1 | 4/2019 | Laster et al. | |
| 2019/0127034 | A1 * | 5/2019 | Larson | G01S 15/89 |
| 2019/0137618 | A1 * | 5/2019 | Hawker | G01S 19/45 |
| 2019/0263487 | A1 | 8/2019 | Corl et al. | |
| 2019/0331779 | A1 | 10/2019 | Sandretto | |
| 2020/0064471 | A1 * | 2/2020 | Gatland | H04N 13/388 |
| 2020/0088840 | A1 * | 3/2020 | Stokes | G01S 13/42 |
| 2020/0180740 | A1 * | 6/2020 | Christ | G05D 1/0027 |
| 2020/0256967 | A1 | 8/2020 | Wigh et al. | |
| 2021/0165068 | A1 | 6/2021 | Clark | |

OTHER PUBLICATIONS

Corrigan, Fintan: DroneZon: Drone Technology, Knowledge, News & Reviews "Drone Gyro Stabilization, IMU and Flight Controllers Explained", May 4, 2018 <https://www.dronezon.com/learn-about-drones-quadcopters/three-and-six-axis-gyro-stabilized-drones/> 15 pages.

Jensen, Attitude Estimation for Motion Stabilization in Sonar Systems, MS Thesis, 2013.

* cited by examiner

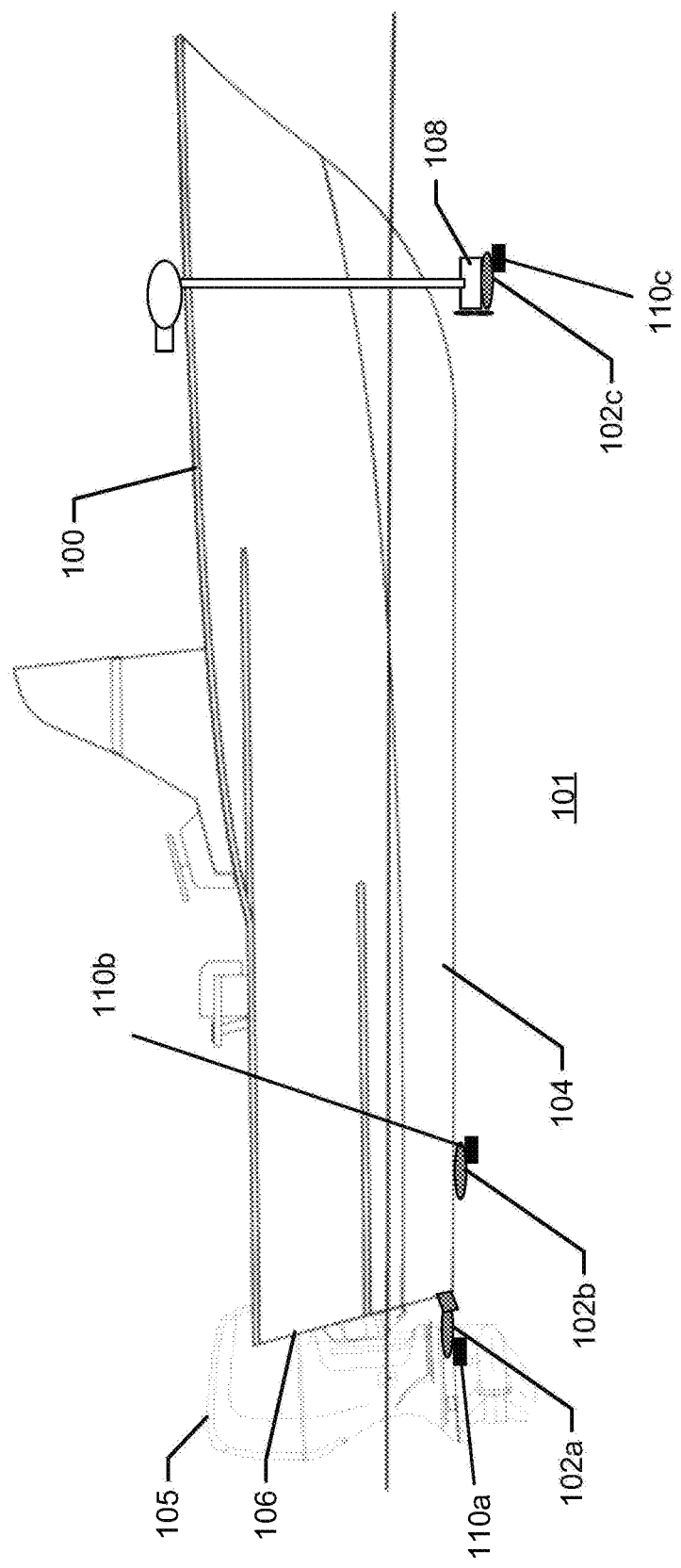

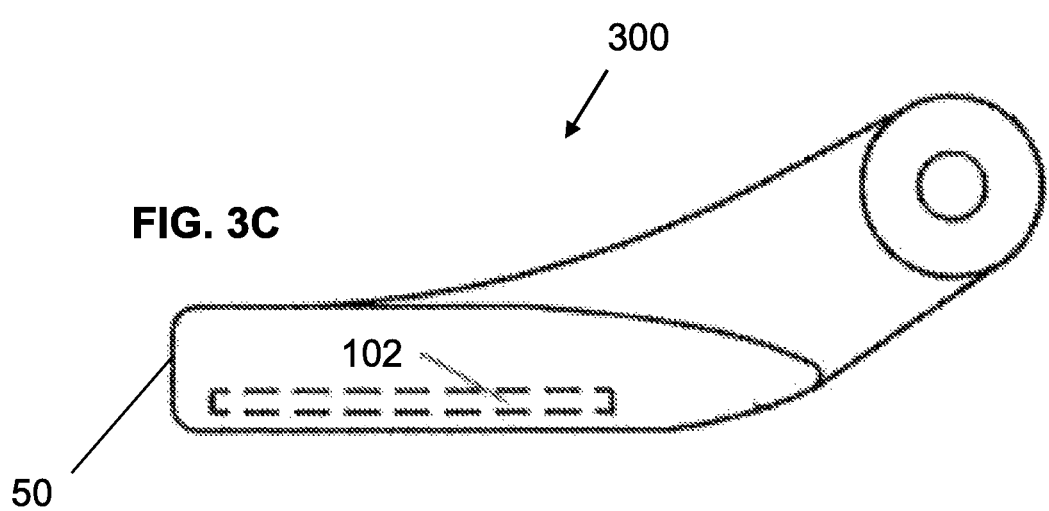

IMPACT DETECTION DEVICES AND METHODS

FIELD OF THE INVENTION

Embodiments of the present invention relate generally to impact detection devices and methods for identifying impacts to sonar transducers.

BACKGROUND OF THE INVENTION

Sonar (SOund Navigation And Ranging) has long been used to detect waterborne or underwater objects. Sonar transducers are often used by recreational boaters and sport fishermen as aids to navigation and fishing. For example, sonar devices may be used to determine depth and bottom topography, detect fish, identify tree stumps, locate wreckage, etc. Due to visibility limits underwater, sonar is typically the most accurate way to locate objects underwater. Sonar transducer elements, or simply transducers, convert electrical energy into sound or vibrations at a particular frequency. A sonar sound beam is transmitted into and through the water and is reflected from objects it encounters. The transducer receives the reflected sound (the "sonar returns") and converts the sound energy into electrical energy. Based on the known speed of sound, it is possible to determine the distance to and/or location of the waterborne or underwater objects. The sonar return signals can also be processed to be displayed a display device, giving the user a "picture" of the underwater environment. The sonar image may be displayed, for example, on a display unit such as a multi-function display or a marine electronic device.

Sonar transducer systems often comprise (a) a watertight pod or housing which contains the sonar transducer itself, (b) a cable connecting the sonar transducer to a power source (such as a marine battery or generator), and (c) a display monitor or screen for viewing the images of the body of water bottom surface and various underwater objects. The sonar transducer housing is typically mounted or installed onto the hull or transom of a watercraft, at a position which will be below the height of the water surface when the watercraft is in the water. The display screen is typically located in the section of the watercraft adjacent to the operating and navigation controls.

BRIEF SUMMARY OF THE INVENTION

Given the cost and sensitivity of sonar transducer systems, it is desirable to avoid any impact between the transducer housing or the transducer itself and underwater objects such as tree stumps, wreckage, and the like. Such object strikes may cause the transducer to move out of the desired orientation or may result in varying degrees of damage to the transducer. The orientation of a sonar transducer relative to a watercraft may affect the quality or accuracy of the sonar returns. For example, a misaligned sonar transducer may indicate portions of underwater environment are closer to the transducer and/or portions of the underwater environment are farther from the transducer than is accurate, due to parallax error.

Unless the user audibly hears the impact, which is often unlikely while the vessel is in motion, the user may not be made aware of any impact until the vessel has been removed from the water and the transducer housing and/or transducer can be visually inspected. Without the user's knowledge, the transducer may have been damaged by the impact and may have been misaligned or may not have been operating properly post-impact. Additionally, if the transducer housing becomes cracked due to an impact and the crack is not immediately visible upon inspection, the user may continue to use the transducer in this condition and water may leak into the housing over time, causing damage the transducer.

Presently, mechanisms exist for limiting potential damage to transducer units during operation, which comprise variations on tilt mechanisms that permit the transducer housing to tilt arcuately about its mount on the hull or transom when the housing impacts an object. The tilt mechanisms, however, only operate to minimize the impact if the impact comprises a direct impact. Additionally, the tilt mechanisms do not notify the operator of any such impact and the operator may not be aware that an object has been struck. In contrast, the present invention provides an impact detection system for marine sonar transducers which notifies the user in real time as to any underwater impact, potentially limiting the damage to the transducer due to the impact. The impact detection system may comprise any device known in the art which can receive an impact, measure the force of the impact, convert the force of the impact into data, and then notify the user of the impact.

In an embodiment, the invention is directed to a system comprising a housing, a marine electronic device, and an electronic device processor. The housing, in this embodiment, may comprise at least one transducer element configured to transmit sound waves into a body of water, receive sonar return signals from the body of water, and convert the sonar return signals into sonar return data. The house may also comprise an impact detection device configured to receive impact data corresponding to an impact on the housing. The marine electronic device may comprise a user interface comprising a display, a marine electronic device processor, and a memory including computer program code configured to, with the marine electronic device processor, cause the marine electronic device to receive sonar return data from the at least one transducer element; generate one or more sonar images based on the sonar return data; receive impact data from the at least one impact detection device; and generate one or more notifications based on the impact data.

In some embodiments, the one or more notifications comprises an alert, light, buzzer, alarm, text, or a combination thereof. The one or more notifications may comprise a quantitative indication of the impact. In an embodiment, the processor may compare the impact data to a predetermined threshold and generates the one or more notifications in an instance in which the impact data meets or exceeds the predetermined threshold. In still other embodiments, the one or more notifications comprises at least a first notification of the impact and a second notification of the impact in an instance in which the impact exceeds a predetermined threshold.

The memory and the computer program code are, in an embodiment, further configured to cause the processor to cause indication of one or more locations associated with the impact data to be displayed on a navigational chart.

In some embodiments, the impact detection device comprises an accelerometer. In such embodiments, the accelerometer may comprise a piezoelectric accelerometer, piezoresistive accelerometer, piezopolymer accelerometer, ultrasonic accelerometer, capacitive accelerometer, thermal accelerometer, or convective accelerometer. The accelerometer may comprise a piezoelectric ceramic or a piezoelectric crystal device. The accelerometer may comprise a single axis accelerometer, a multi-axis accelerometer, or a rotational accelerometer. The impact data, in an embodiment, may comprise an output voltage or an electric charge, pulse, or signal. The housing may be mounted to a boat or trolling motor.

In another embodiment, the invention is directed to a system comprising a housing, a marine electronic device, and an electronic device processor. In this embodiment, the housing may comprise at least one transducer which comprises at least one piezoelectric element and is configured to: transmit sound waves into a body of water, receive sonar return signals from the body of water, vibrate in response to receipt of sonar return signals or an impact on the housing, and convert the vibrations into vibration data. The marine electronic device may comprise a user interface comprising a display, a marine electronic device processor, and a memory including computer program code configured to, with the marine electronic device processor, cause the marine electronic device to: receive vibration data from the at least one transducer; determine if the vibration data corresponds to an impact on the housing; generate one or more sonar images based on the vibration data; and generate one or more notifications based on the vibration data in an instance in which the vibration data corresponds to an impact on the housing.

In an embodiment, the electronic device filters out any vibration data which corresponds to an impact on the housing prior to generation of one or more sonar images. In an embodiment, the vibration data is generated in response to sonar return signals and an impact on the housing.

In still another embodiment, the invention is directed to a method for identifying object strikes to a sonar transducer system, wherein the method comprises: receiving, by a processor, impact data from at least one impact detection device which is located adjacent the sonar transducer system, wherein the at least one impact detection device is configured to receive impact data corresponding to an impact on the housing; comparing, by the processor, the impact data to a predetermined threshold; and generating, by the processor, one or more notifications in an instance in which the impact data meets or exceeds the predetermined threshold. In an embodiment, the processor causes an indication of one or more locations associated with the impact data to be displayed on a navigational chart.

BRIEF DESCRIPTION OF THE DRAWINGS

Figure 1B:
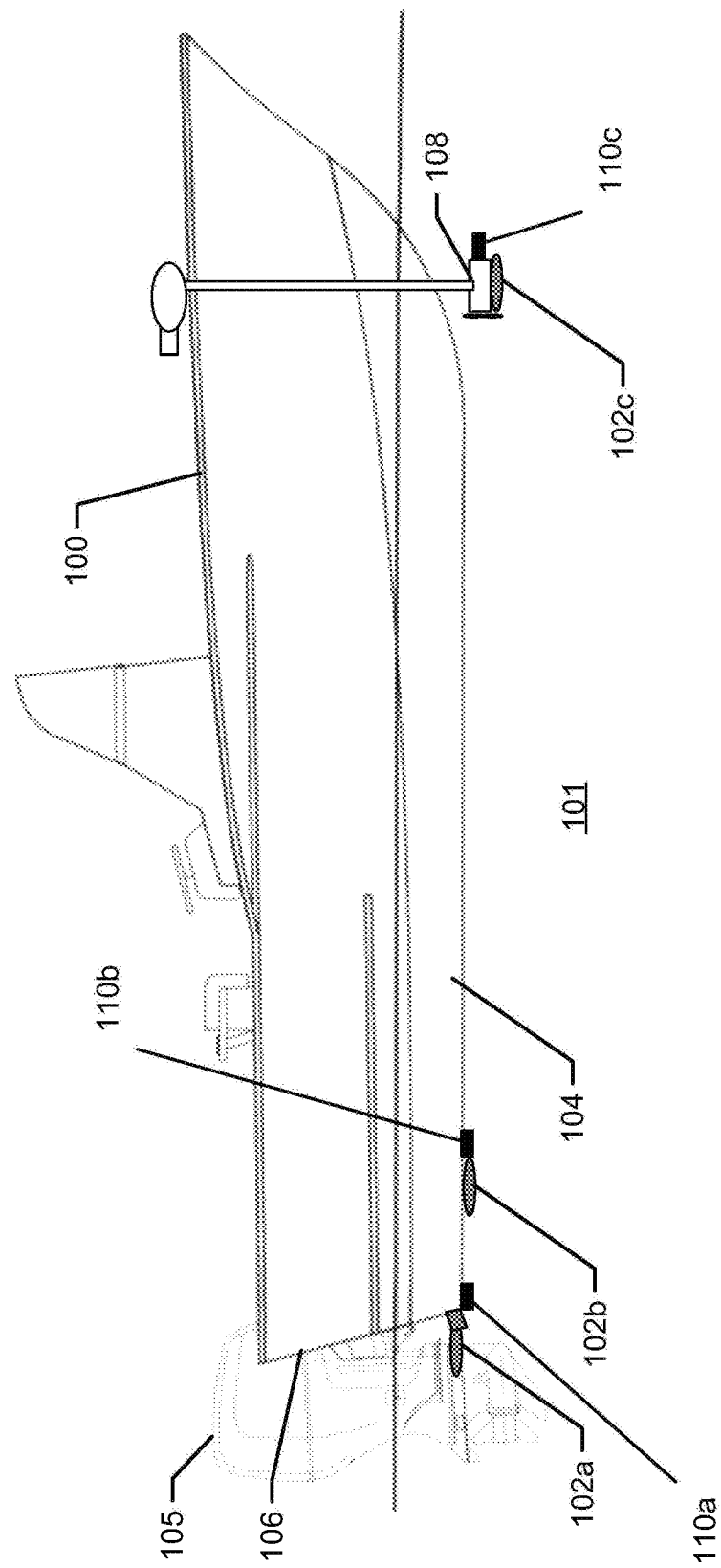
Figure 2A:
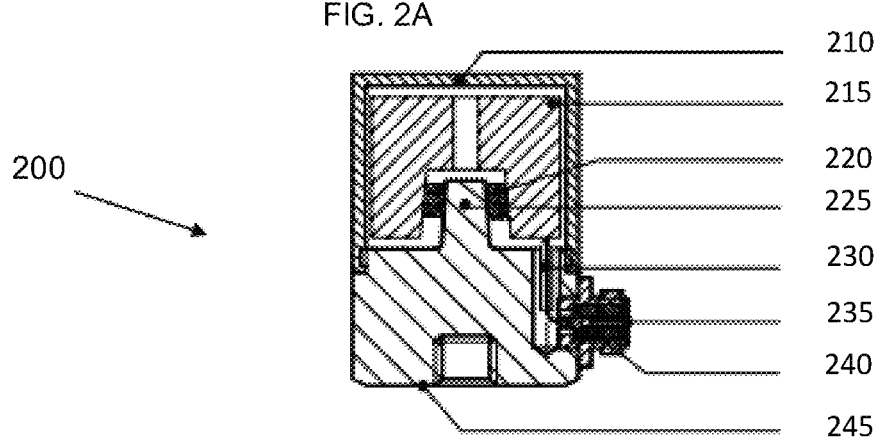
Figure 2B:
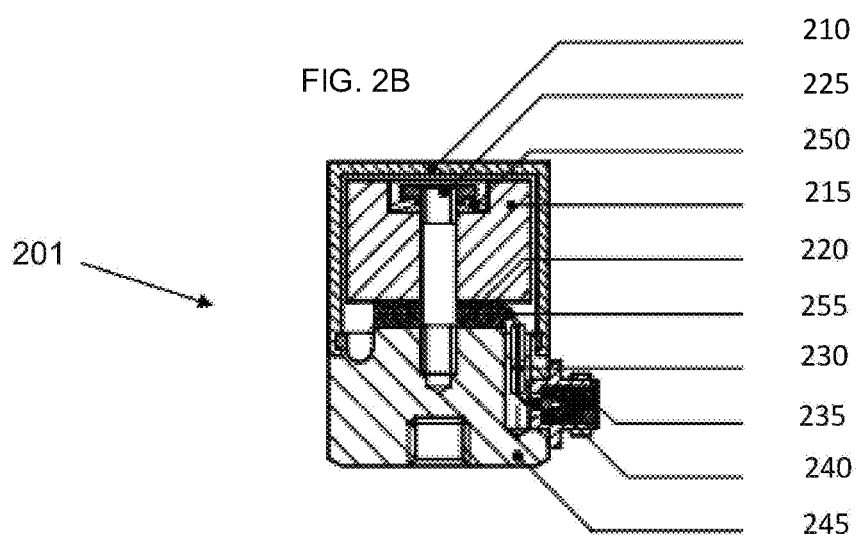
Figure 2C:
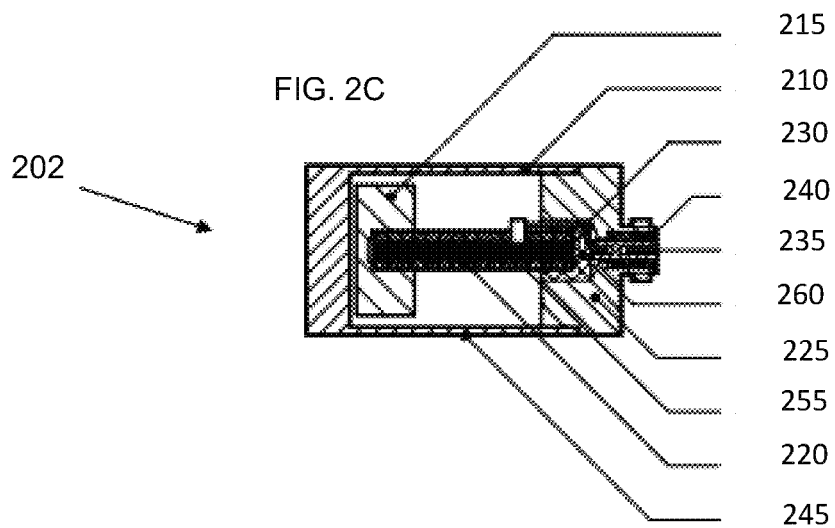
Figure 3A:
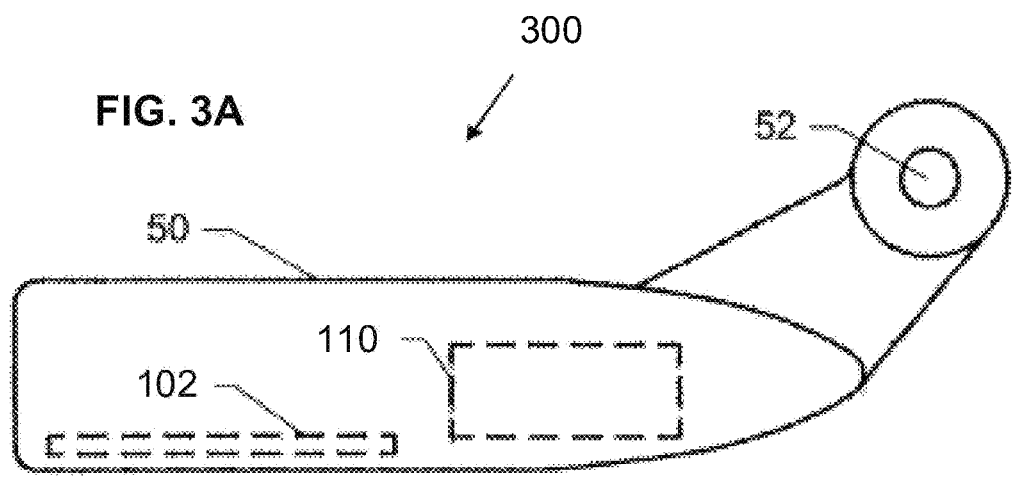
Figure 3B:
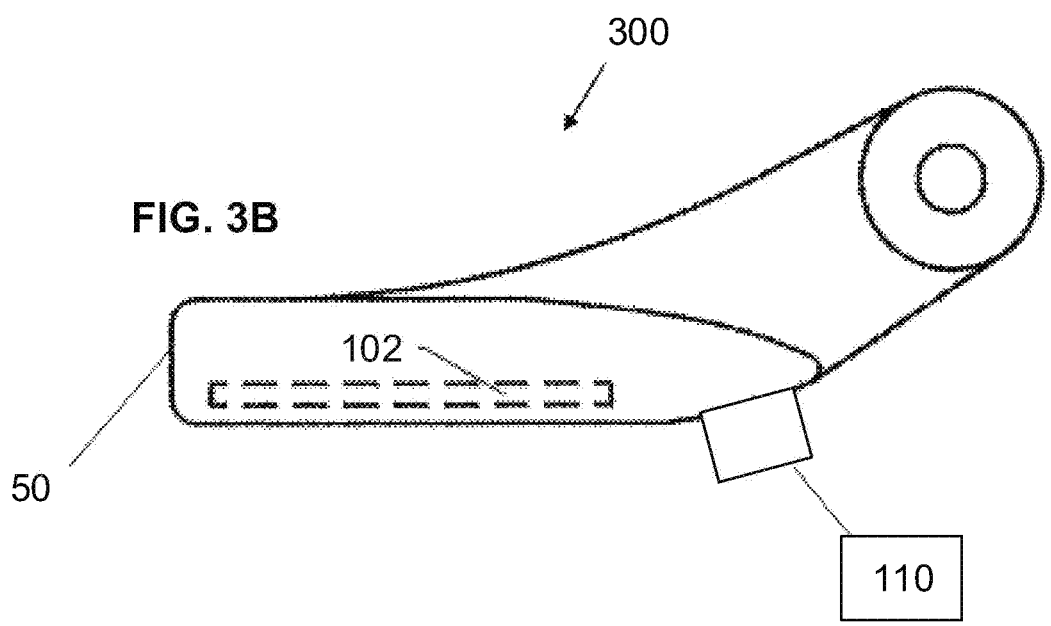
Figure 4:
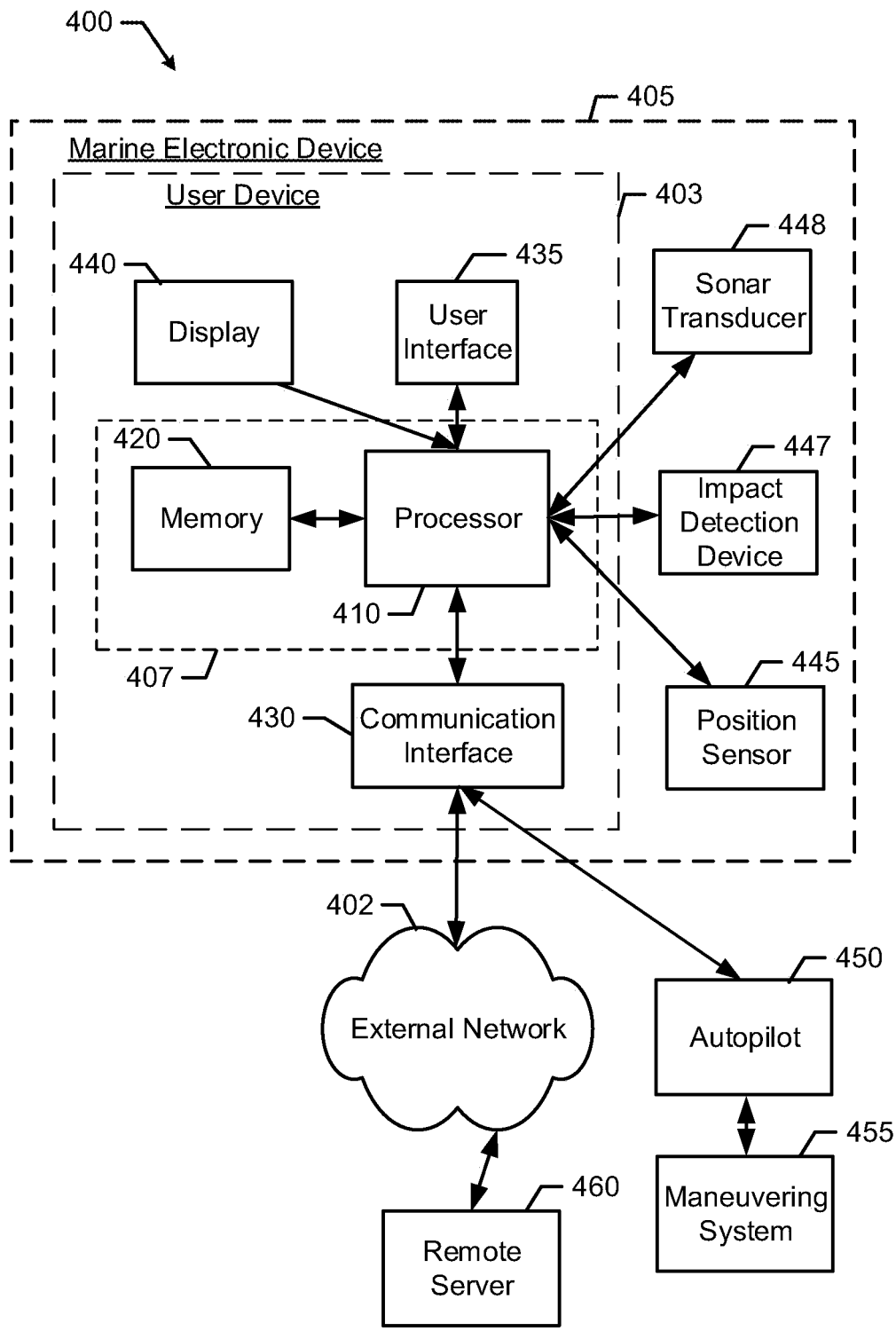
Figure 5:
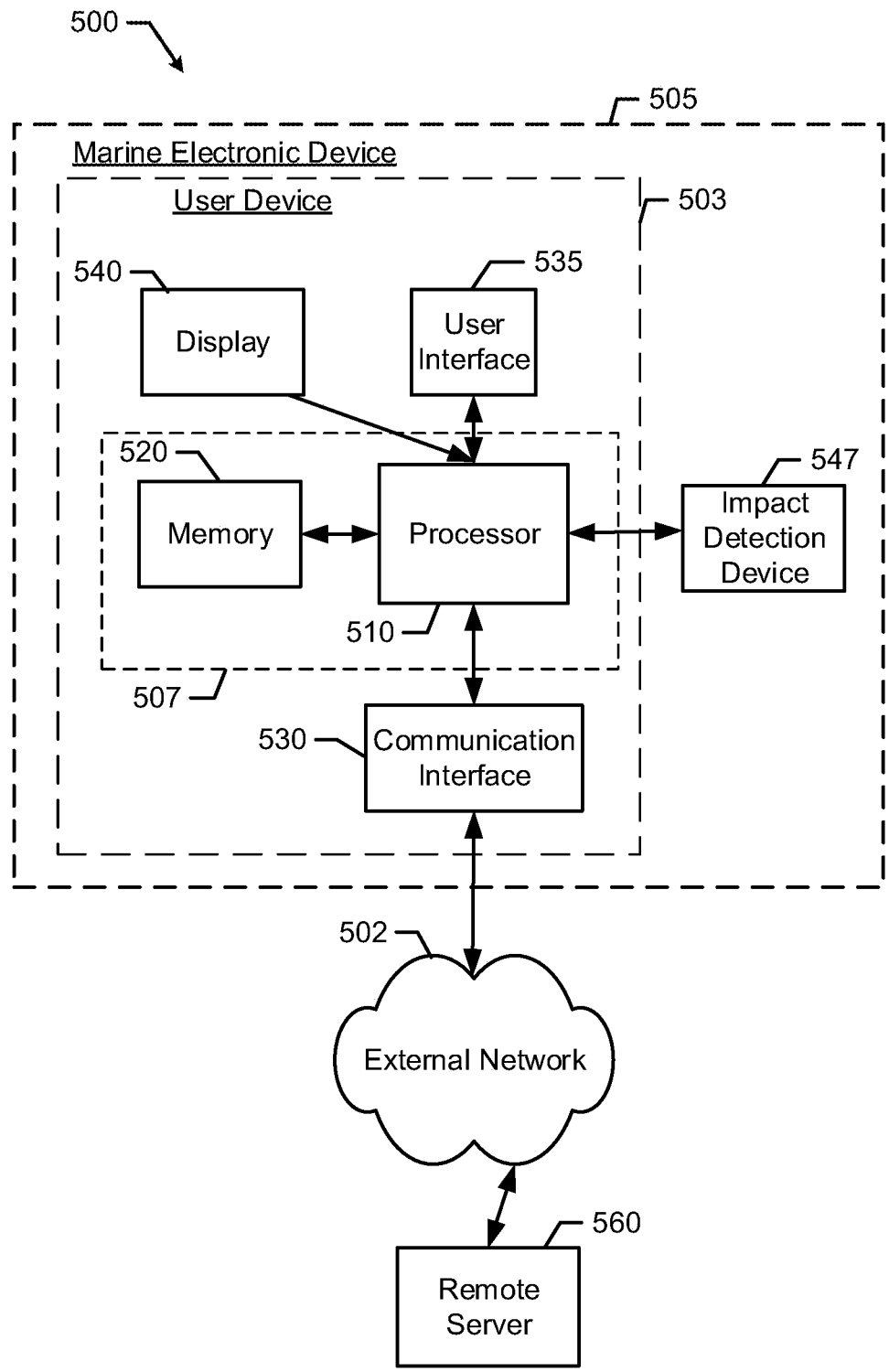
Figure 6:
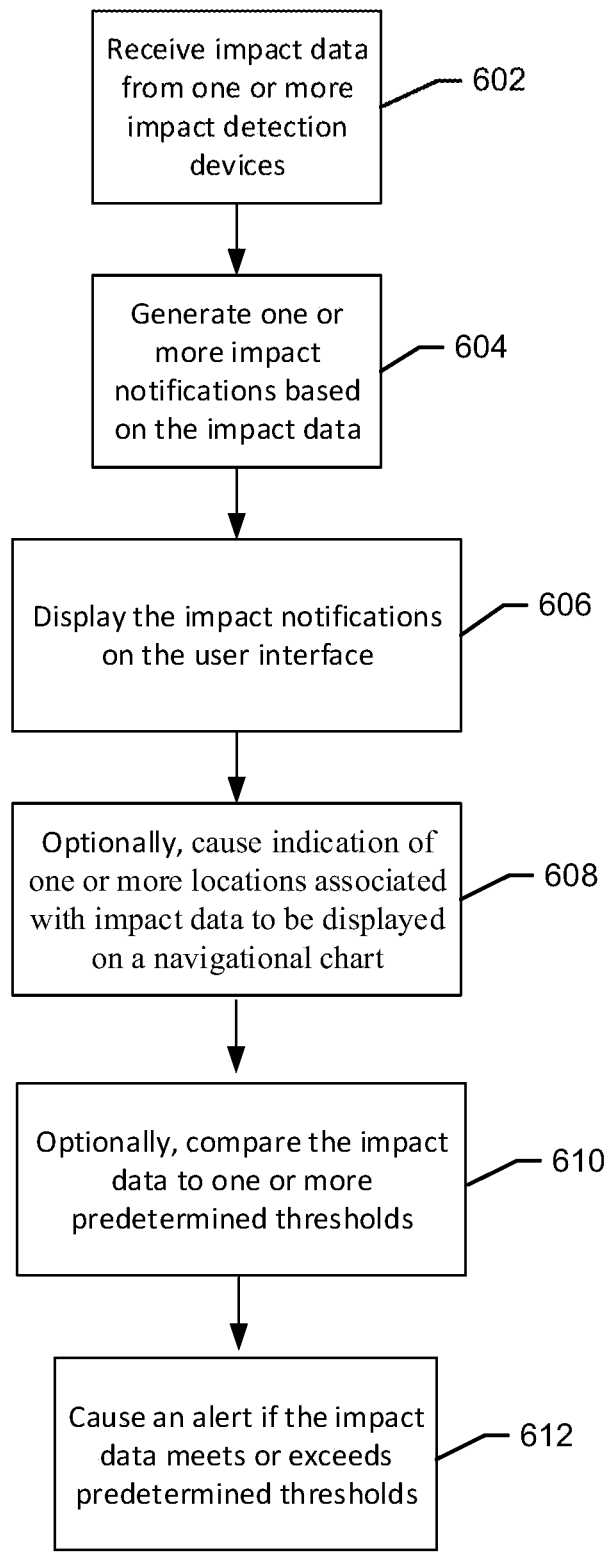
Figure 7:
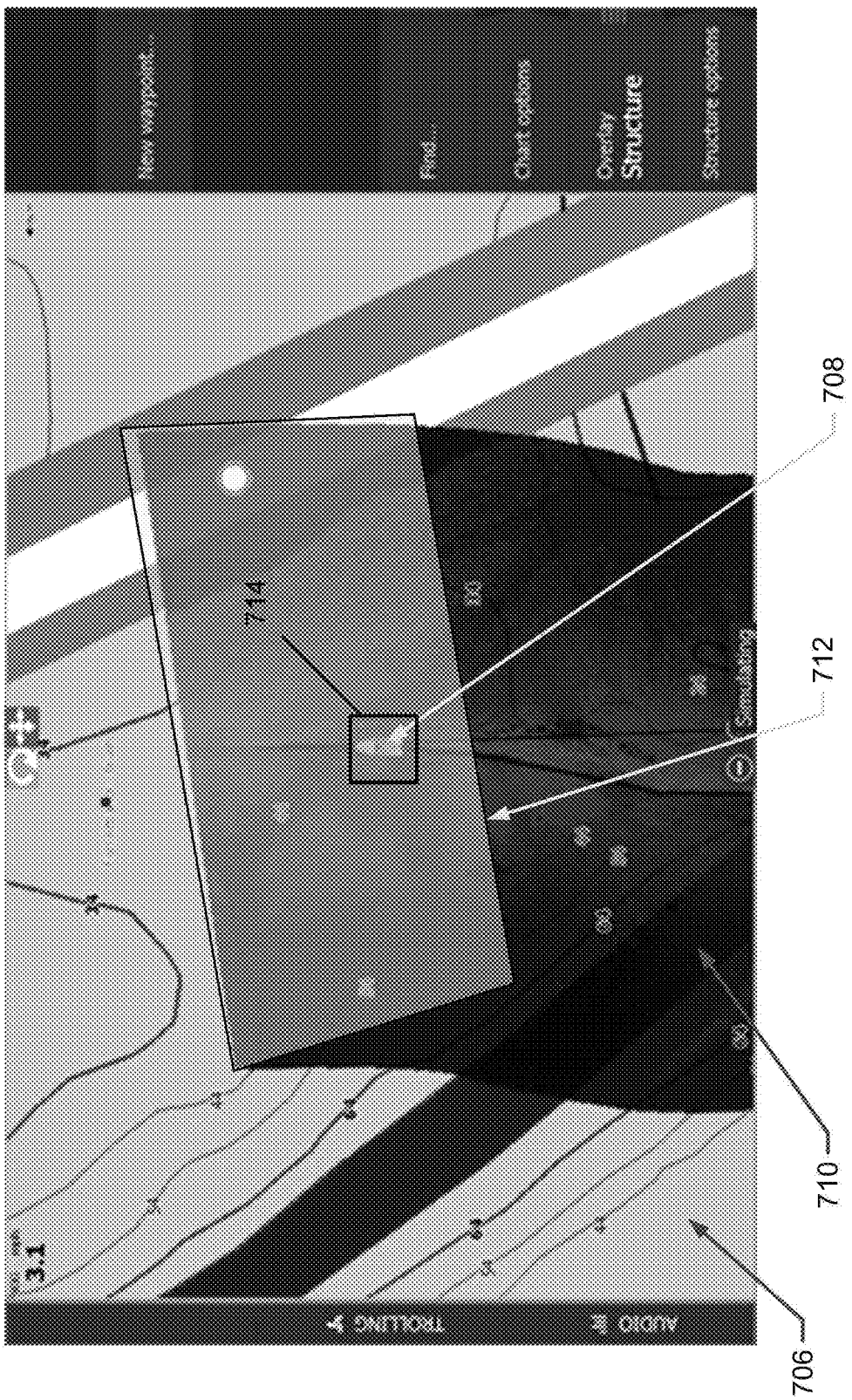
Figure 8:
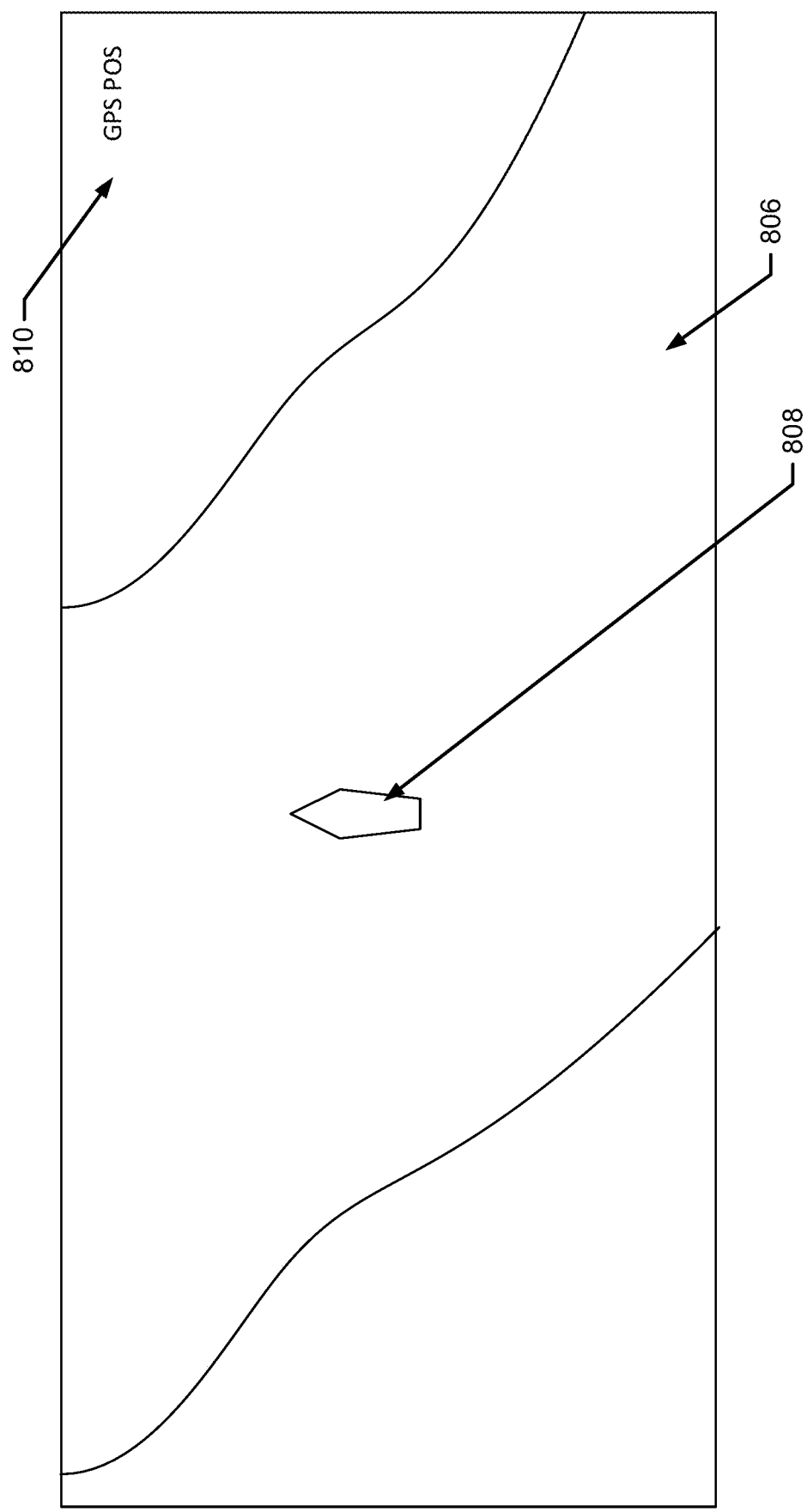

Having thus described the invention in general terms, reference will now be made to the accompanying drawings, which are not necessarily drawn to scale, and wherein:

FIGS. 1A-1B illustrates example vessels including various sonar transducer assemblies and impact detection devices in accordance with some embodiments discussed herein;

FIGS. 2A-2C illustrate cross-sectional views of exemplary piezoelectric accelerometers which may be used in various embodiments of the present invention;

FIGS. 3A-3C illustrate side views of exemplary marine electronic devices and systems in accordance with some example embodiments discussed herein;

FIG. 4 illustrates an exemplary block diagram of a marine electronic device and system in accordance with some example embodiments discussed herein;

FIG. 5 illustrates an exemplary block diagram of a marine electronic device and system in accordance with some example embodiments discussed herein;

FIG. 6 illustrates a flowchart of an example method of providing impact data according to some embodiments discussed herein;

FIG. 7 illustrates an example sonar image according to some embodiments discussed herein; and FIG. 8 illustrates an example navigational chart with sonar overlay according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As noted above, the present invention provides an impact detection system for marine sonar transducers which notifies a user in real time as to underwater impacts. In an embodiment, the impact detection system receives an impact, measures the force of the impact, converts the force of the impact into data, and then notifies the user of the impact.

In some embodiments, the impact detection system of the present invention utilizes elements which are present in the transducer (i.e. piezo elements or sensors) to determine whether an impact has occurred, capturing any impact pulse signals before the analog filtering of other signals, such as sonar signals, occurs. In an embodiment, the system then converts the impact signals into impact data, analyzes such data, and notifies the user of any relevant impact.

In this embodiment, the transducer may transmit sound waves into a body of water, receive sonar return signals from the body of water, and vibrate in response to the receipt of sonar return signals and/or an impact on the housing. The vibrations may then be converted into vibration data and transmitted to a processor. In an embodiment, the vibration data comprises both sonar return signals and an impact on the housing and, optionally, data generated related to the impact is filtered out before the vibration data is used by the processor to generate one or more sonar images.

Generally speaking, an impact comprises a large acceleration over a short period of time. As such, in other embodiments, the impact detection system may comprise an accelerometer. A collision with an object may cause a momentary change in the acceleration, or may cause a momentary change in the acceleration direction. In some instances, the acceleration may drop and return to, or near, a pervious value. In some embodiments, the accelerometer may measure this change in acceleration and provide impact data accordingly.

In this embodiment, the accelerometer may comprise a piezoelectric accelerometer, piezoresistive accelerometer, piezopolymer accelerometer (e.g. using polyvinylidene fluoride (PVDF)), ultrasonic accelerometer, capacitive accelerometer, thermal accelerometer, convective accelerometer, or micro-electric mechanical accelerometer systems. If a piezo device is utilized, it may comprise a piezoelectric ceramic, such as lead zirconate titanate, barium titanate, potassium niobate, sodium tungstate, $Ba_2NaNbO_5$, $Pb_2KNb_5O_{15}$, zinc oxide, sodium potassium niobate, bismuth ferrite, sodium niobate, bismuth titanate, or sodium bismuth titanate. If a piezo device is utilized, it may alternatively comprise a naturally-occurring piezoelectric crystal such as quartz, berlinite, sucralose, Rochelle salt, topaz, tourmaline-group minerals, or lead titanate or it may comprise a synthetic piezoelectric crystal such as langasite, gallium orthophosphate, lithium niobate, or lithium tantalate. The piezo crystal, if utilized, may comprise any bulk or nano structured semiconductor crystal having non central symmetry, such as the Group III-V and II-VI materials.

The accelerometer may comprise a single axis accelerometer, a multi-axis accelerometer (1, 2, or 3 axes), or a rotational accelerometer. The device may have a shear design, a compression design, or a bender or cantilever design.

Generally speaking, piezoelectric materials exhibit electro-elastic coupling. The piezo materials convert a portion of the energy associated with any internal mechanical strain into recoverable electrical energy. Piezoelectric transducers convert mechanical energy (when strained or impacted) into an electric signal through the piezoelectric effect. This electric signal (i.e. the output voltage) is proportional to the mechanical strain of the piezo and therefore, it is proportional to the acceleration and/or impact received.

There are many variables within a piezoelectric device, but generally speaking, the piezo device comprises a piezoelectric crystal or ceramic element, sandwiched between two electrodes and in contact with a seismic mass. When the device is struck by an object, the seismic mass is displaced, causing a deformation in the crystal or ceramic. In the case of piezo crystals, for example, the crystal modifies its internal alignment of negative and positive ions and results in an accumulation of an electric charge, which is measured by the electrodes as an output voltage. Similarly, a mechanical impact on a poled piezoelectric ceramic element changes the dipole moment, creating an output voltage. Acceleration can then be measured according to Newton's second law: force (the output voltage) equals mass (which is constant) times acceleration.

In various embodiments, the electrodes may be metal such as Al, Mo, Pt, Au or metal alloys. The noted electrode materials are merely illustrative, however, and any materials known in the art may be utilized.

The inventive impact detection device may be high or low impedance. High-impedance units have a charge output that requires a charge amplifier or external impedance converter for charge-to-voltage conversion, which may be encompassed in the invention. Low-impedance units use the same piezoelectric sensing element as high-impedance units and incorporate a miniaturized built-in charge-to-voltage converter. They also require an external power supply coupler to energize the electronics and decouple the subsequent DC bias voltage from the output signal. The piezoelectric device of the present invention may have an integrated electronics circuit to convert a high impedance output (high voltage, low current) of the piezoelectric to a low impedance (low voltage, high current) voltage signal.

In the invention, some level of impact detection signal processing will generally be necessary. It may also be necessary, as part of the invention, to filter out noise and interference from the impact detection signals. The most appropriate choice of filtering techniques is dependent on the characteristics of the impact detection device, amplifiers, and data acquisition system. In an embodiment, in the inventive impact detection system, the processor may be configured to receive analog or digital information related to the impact measured by the impact detection device (i.e. accelerometer) and communicate that information to the user in a digital format. The system may include analog-to-digital conversion capabilities to communicate digital data to the user.

In an embodiment, the impact detection system notifies a user via a display, such as a multi-function display, when it registers an impact. In some embodiments, the notification is qualitative (i.e. displays a message: "An impact has been detected").

In an embodiment, the impact must meet a certain measurable threshold before a notification is generated. For example, if an accelerometer is utilized to measure a change in acceleration the threshold acceleration change may be 1 meter per second, 2 meters per second, or any other suitable value in a predetermined time period such as 0.5 seconds, 1 second, or other suitable time period.

In some embodiments, the impact detection system notifies the user and provides a quantitative measurement of the impact. In still another embodiment, the impact detection system provides the user with a quantitative measurement of the impact within a range (i.e. displays a message: "A [minor/moderate/severe] impact has been detected"). In certain embodiments, wherein there is a severe impact, for example, the inventive system may recommend corrective actions, such as that the user stop the vessel and examine any impact-related damage to the transducer housing and assembly. Similarly, the inventive system may recommend a corrective action that the user stop the vessel and adjust the mounting of the transducer assembly due to the impact. In some embodiments, the corrective actions may include contacting a support service for further diagnoses and/or repair.

In an embodiment, the notification which is generated by the system comprises any suitable audio or visual indication, or combination thereof, such as an alert, light, buzzer, alarm, text indication, or the like. The notification may be sounded or displayed on a user interface to draw the attention of the user to the marine electronic device and inform the user of the impact.

In an embodiment, a notification is generated for each measurable impact which comprises a visual message and an additional audible alarm is generated if the impact exceeds a predefined threshold. The predetermined thresholds may comprise impact values that may be indicative of a significant impact. The system may, in some embodiments, compare the measured impact to a reference impact value, which may be stored in memory, such as in an impact lookup table. The marine electronic device may compare the measured impact value to the reference impact values, as identified in the lookup table, and determine the severity of the impact accordingly.

In an embodiment, the notification which is generated by the system comprises marking a location on a preexisting map. In another embodiment, the inventive system may generate one or more images or maps illustrating the impact locations and/or the intensity of the impact. The user may be able to avoid these location in the future, thereby avoiding future impacts. In an embodiment, the inventive system additionally alerts the user if the vessel passes within a circumferential or other range of a pre-marked impact location. In various embodiments, the inventive system may allow a user to share the impact location with other system users, via a mapping system, GPS location, or otherwise.

In an example embodiment, the locations associated with the impact data may be plotted on a navigational chart. In some embodiments, various sets of impact data may be superimposed or overlaid onto one another on a navigational chart. In addition, a route may be applied to (or overlaid onto) a map or navigational chart which indicates impact data locations. Additionally or alternatively, depth information, weather information, radar information, sonar information, or any other navigation system inputs may be applied to (or overlaid onto) a map or navigational chart which indicates impact data locations.

In an embodiment, the inventive system may notify a remote server, such as a support center of impacts that it registers. In an example embodiment, the notification to the remote server may identify the impact severity and/or provide additional information, such as location of the impact. In some example embodiments, the system may transmit user identifier or device identifier information in association with the indication of the impact to the remote server. The user or device identifier may include a serial number, model number, user number, or the like and may include any suitable number, letter, and/or character. The user or device identifier may be associated with a user profile including, for example, a name, device model, contact information, or the like, and the user or device identifier may assist the service provider in contacting the user and/or providing the service technician with device information for diagnostic purposes.

Referring now to the drawings, as depicted in FIGS. 1A and 1B, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies may each include one or more transducer elements configured to transmit sound waves into a body of water, receive sonar return signals from the body of water, and convert the sonar return signals into sonar return data.

In an example embodiment, a vessel 100 may include a main propulsion motor 105, such as an outboard or inboard motor. Additionally, the vessel 100 may include trolling motor 108 configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c. In an embodiment, the transducer assemblies may be mounted in any location on the vessel 100 which is underwater while the vessel is in the water.

An impact detection device 110 may be utilized in connection with any of the transducer assemblies (e.g., 102a, 102b, and/or 102c) shown. In an embodiment, the impact detection device may be mounted onto the exterior of the transducer housing (see FIG. 1A, elements 110a, 110b, 110c) or within a transducer housing (see FIG. 3). In other embodiments, the impact detection device may be mounted onto the transducer itself or incorporated into the transducer, as discussed above. In the embodiment shown in FIG. 1B, the transducer and impact detection device (elements 110a, 110b, 110c) may be contained in separate housings and the impact detection device housing may be mounted adjacent the transducer housing. In this embodiment, the impact detection device (elements 110a, 110b, 110c) housing may be mounted directly on the hull, transom, or trolling motor.

If the impact detection device 110 is mounted on the transducer or transducer housing, the impact detection device 110 may be mounted in a location on the transducer/housing which is near the bow of the vessel or is near the most likely location of an object strike. Similarly, if the impact detection device 110 is housed separately from the transducer, the impact detection device 110 housing may be mounted in a location on the hull, transom, or trolling motor which is near the bow of the vessel, near the transducer housing, or is near the most likely location of an object strike.

FIG. 2 illustrates exemplary accelerometer designs which may be utilized in various embodiments of the invention. For example, FIG. 2A illustrates a shear design 200, a compression design 201, and a bender design 202. The shear design 200 comprises a case 210, a seismic mass 215 which is ring-shaped, piezo ceramics 220, a central post 225, a wire 230, a connector 235, insulation 240, and a mounting base 245. In a shear design, the piezoelectric component 220 is stressed in a shear manner. The piezoelectric component 220 is sandwiched between a center post 225 and the seismic mass 215. The piezoelectric component 220 may be mounted radially around the post 225. The seismic mass 215 may then be mounted radially around the piezoelectric component 220. A compression ring or case 210 often holds the device in place. In the shear design, a deformation of the piezoelectric element, produced by a shear force, is used for producing an electric charge.

FIG. 2B illustrates the compression design 201 and comprises a case 210, a central post 225, a spring 250, a seismic mass 215, piezo ceramics 220 (compression disks), an electrode 255, a wire 230, a connector 235, insulation 240, and a mounting base 245. In the compression mode, a piezoelectric component 220 sits between a base 245 (which may be flat in some embodiments) and a seismic mass 215. The components are stacked upon each other. A stud or post 225 extends through the mass 215 and piezoelectric component 220 and holds the components in place. In the compression design, a longitudinal compression of the piezoelectric element, in the direction of the sensitive axis, produces an electric charge.

FIG. 2C illustrates a bender design 202 and comprises a seismic mass 215, a case 210, a wire 230, insulation 240, a connector 235, cast resin 260, a post 225, an electrode 255, piezo ceramics 220 (bending beam), and a mounting base 245. A bender accelerometer typically tresses the piezoelectric component 220 by bending it and creating the electric charge.

It should be recognized that not every accelerometer component described herein would be necessary in the accelerometer design of the invention. Similarly, additional components may be incorporated into any such accelerometer design. Any accelerometer concept known in the art could be utilized in the present invention.

FIG. 3 illustrates embodiments of the inventive system 300 comprising a transducer 102 and an impact detection device 110. The transducer 102 may include housing 50 that may include one or more mounting holes 52 through which screws, rivets, bolts or other mounting devices may be passed in order to fix the housing 50 to a mounting bracket, a device attached to a vessel or to the hull of the vessel itself. However, in some cases, the housing 50 may be affixed by welding, adhesive, snap fit or other coupling means. The housing 50 may be mounted to a portion of the vessel, or to a device attached to the vessel, that provides a relatively unobstructed view of at least the column of water beneath the vessel. Thus, for example, the housing 50 may be mounted on or near the keel (or centerline) of the vessel, on a fixed or adjustable mounting bracket that extends below a depth of the keel (or centerline) of the vessel, or on a mounting device that is offset from the bow or stern of the vessel.

In an embodiment, shown in FIG. 3A, the housing 50 may contain both a transducer 102 and an impact detection device 110. In another embodiment, shown in FIG. 3B, the housing may contain the transducer 102 and the impact detection device 110 may be mounted on the exterior of the housing 50. Any method known in the art may be utilized to mount the impact detection device 110 to the housing 50, whether contained inside or mounted on the exterior thereof, including but not limited to screws, rivets, bolts, mounting brackets, welding adhesive, snap fit, or the like. In an embodiment, the impact detection device 110 is mounted in a location which is likely to receive the majority of the impact of any object strike, thereby protecting the transducer 102.

Example Architecture

FIG. 4 shows a block diagram of computing device, such as computing device 403. The depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with an autopilot 450 or network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine data system 400.

The marine electronic device 405 may include a processor 410, a memory 420, a user interface 435, a display 440, one or more sensors (e.g. position sensor 445, other sensors 447, etc.), a sonar transducer 448, and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, impact detection data, sensor data, location data, and/or additional environmental data.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect impacts, object strikes, depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device may transmit data to the remote server, such as a support service server. In some example embodiments, the marine electronic device may transmit a user identifier and/or a device identifier to the remote server.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 4 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405. Similarly, the autopilot 450 is depicted remote from the marine electronic device 405, but may be directly connected to the processor 410 within the marine electronic device.

The marine electronic device 405 may include one or more impact detection devices 447 as described herein. The marine electronic device may also be configured to include other sensors which may, for example, measure environmental conditions. The other sensors may include, for example, an air temperature sensor, a water temperature sensor, a current sensor, a light sensor, a wind sensor, a speed sensor, or the like.

The autopilot 450 may include processing circuitry, such as a processor and a memory, configured to operate the maneuvering system 455. The autopilot 450 may be configured to operate the maneuvering system automatically, e.g. without user interaction, causing the vessel to travel along a route, such as along a predetermined sonar sea trial route. The autopilot 450 may generate instructions based on a vessel position, the sea trail route, or the like to operate the maneuvering system 455.

The maneuvering system 455 may include one or more propulsion motors, or engines, including but not limited to, outboard motors, inboard motors, trolling motors, main engines, emergency propulsion motors, or the like. Additionally, the maneuvering system 455 may include one or more control surfaces, such as rudders, planes, or the like configured to steer the vessel.

The sonar transducer 448, such as transducer assemblies 102a, 102b, and 102c, may be housed in a trolling motor housing, attached to the vessel 100 or, in some cases, may be castable. The sonar transducer 448 may be configured to gather sonar return signals, e.g. sonar returns, from the underwater environment relative to the vessel 100. Accordingly, the processor 410 may be configured to receive the sonar return data from the sonar transducer 448, process the sonar return data to generate an image including a sonar image based on the gathered sonar return data. In some embodiments, the marine electronic device 405 may be used to determine depth and bottom contours, detect fish, locate wreckage, etc. Sonar beams or pulses, from a sonar transducer 448, can be transmitted into the underwater environment. The sonar signals reflect off objects in the underwater environment (e.g. fish, structure, sea floor bottom, etc.) and return to the transducer assembly, which converts the sonar returns into sonar return data that can be used to produce an image of the underwater environment.

As noted herein, the impact detection device 447 may be configured to receive an impact and generate an impact signal. Accordingly, the processor 410 may be configured to receive the impact signal from the impact detection device 447 and process the impact signal to generate impact data, an image, or a notification based on the gathered impact signal.

As an alternative, FIG. 5 shows a block diagram of another computing device 503 and marine electronic device 505 which includes an impact detection device but is separate from any transducer or other devices. The marine electronic device 505 may include a processor 510, a memory 520, a user interface 535, a display 540, an impact detection device 547, and a communication interface 530. As noted above, the communication interface 530 may be configured to enable connection to external systems (e.g. an external network 502). In this manner, the marine electronic device 505 may retrieve stored data from a remote server 560 via the external network 502 in addition to or as an alternative to the onboard memory 520. Additionally or alternatively, the marine electronic device 505 may transmit data to the remote server 560, such as a support service server.

With reference to FIG. 1, one or more sonar beams may be generated by the one or more transducer assemblies 102a, 102b, and 102c when deployed in the body of water 101. In some instances, a plurality of transducer elements may be embodied in a transducer array. One example transducer array may be a forward scanning sonar transducer array. In some instances, the transducer array may include one or more of a right scanning (e.g., sidescan) element, a left scanning (e.g., sidescan) element, a conical sonar element, and/or a bar (e.g., linear) downscan sonar element, which may be housed within a transducer housing. In some example embodiments, the transducer array may be a phased transducer array, e.g. a "phased array." The phased array may include a plurality of transducer elements arranged on a PCB (printed circuit board). The PCB may mechanically support and electrically connect the electronic components, including the transducer elements using conductive tracks (e.g. traces), pads, and other features. The conductive tracks may comprise sets of traces, for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals. In such embodiments, one or more impact detection devices 110 may be present in, on, or near some or all of the transducer assemblies in the array.

The transducer arrays or individual transducer elements may transmit one or more sonar beams into a body of water with a transmit transducer, a transmit/receive transducer, or similar device. When the sound waves, of the sonar beams, strike anything of differing acoustic impedance (e.g., the sea floor or something suspended in the water above the bottom), the sound waves reflect off that object. These echoes or sonar return signals may strike a transducer element (e.g., a transmit/receive transducer, a separate sonar receiver element, or the like), which converts the echoes back into an electrical signal that are processed by a processor (e.g., processing circuitry 407 as discussed in reference to FIG. 4) and sent to a display, which may be mounted in a convenient location on the watercraft. Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings may be used to build a picture on the display of the underwater environment, e.g. a sonar image.

In an example embodiment, the one or more transducers assemblies may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a three-dimensional position of the sonar return signals (and, for example, a corresponding object in the underwater environment).

Example Flowchart(s) and Operations

Embodiments of the present invention provide methods, apparatus and computer program products for providing transducer impact data to a user. Various examples of the operations performed in accordance with embodiments of the present invention are be provided with reference to FIG. 6.

FIG. 6 illustrates a flowchart according to example methods for obtaining impact or object strike information according to an example embodiment. The operations illustrated in and described with respect to FIG. 6 may, for example, be performed by, with the assistance of, and/or under the control of one or more of the processor 410, 510, memory 420, 520, communication interface 430, 530, user interface 435, 535, position sensor 445, other sensor, sonar transducer 448, display 440, 540, autopilot 450 and/or maneuvering system 455. The method may include receiving impact data from one or more impact detection devices at operation 602. The processing circuitry 407, 507 may receive the impact data from the impact detection device 447, 547 through a wired or wireless connection, as discussed above in reference to FIG. 1.

The processing circuitry 407, 507 may generate one or more impact notifications based on the impact data at operation 604. The processing circuitry 407, 507 may display one or more impact notifications based on the impact data at operation 606.

In some example embodiments, the processing circuitry 407, 507 may be configured to store the impact data to the memory 420, 520. For example, the processing circuitry 407, 507 may be configured to store the impact location on one or more maps or images using GPS information. In an example embodiment, the processing circuitry 407, 507 may cause a series of directions to be displayed on the user interface 435, 535 to instruct the user to record certain impact data.

In an example embodiment, the processing circuitry 407, 507 may apply machine learning to the impact data and/or created maps. For example, supervised learning or semi-supervised learning may be used to identify one or more high risk impact locations. The machine learning may include one or more of regression learning, classification learning, clustering, or the like.

In an example embodiment, the processing circuitry 407, 507 may cause an indication of one or more locations associated with the impact data to be displayed on a navigational chart at step 608. The indication of locations may be plots of areas in which the impact data was collected or one or more trails of routes in which the impact data was collected. In some embodiments, the impact data or a portion of the impact data may be overlaid on the navigational chart. FIG. 7 depicts a navigational chart 706 including the location 714 of a watercraft 708. A sidescan sonar image 710 is overlaid on the navigational chart based on the location of collection of the sonar data. Here the sonar image 710 includes a highlighted portion 712 indicating that that portion of the sonar data was collected while at least one transducer was not in the desired orientation, potentially due to an object strike. Accordingly, in an embodiment, the processing circuitry 407, 507 may cause an indication of location 714 to be displayed on the navigational chart 706 and/or saved in the memory. The indicated location 714 may be an exact, precise location, or may be a location identified within a range (i.e. within 25, 50 or 100 yards in any direction of a particular GPS position).

In some example embodiments, the system may indicate that the sonar data collected within a certain time frame or within a certain location range may not be accurate due to an identified object strike. As depicted in FIG. 7, the highlighted portion 702 of the two dimensional sonar data 700 may indicate that the sonar data collected in the location of the highlighted portion 702 may be inaccurate, due to an object strike or other impact.

FIG. 8 depicts a navigational chart 806, e.g. nautical chart, including a watercraft position 808. As indicated by the text box 810, the watercraft position 808 indicated is the current location calculated based on GPS position data. In some example embodiments, the processor 410 may be configured to mark or otherwise indicate one or more locations 808 associated with the impact data received.

In an example embodiment, the processing circuitry 407, 507 may compare the received impact data to one or more predetermined thresholds at step 610. The processing circuitry 407, 507 may analyze the impact data and/or classify the impact. The processing circuitry 407, 507 may determine whether or not to generate a notification to the user based upon whether the impact data meets one or more thresholds values. Similarly, the processing circuitry 407, 507 may automatically notify the user of all impacts but determine whether or not to generate an alert to the user based upon whether the impact data meets one or more thresholds values at step 612. The alert may be any suitable audio or visual indication, such as a light, buzzer, alarm, text indication, or the like. The processing circuitry 407, 507 may cause the alert to be sounded or displayed via user interface 435, 535.

FIG. 6 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420, 520 and executed by, for example, the processor 410, 510. As will be appreciated, any such computer program product may be loaded onto a computer or other programmable apparatus (for example, a marine electronic device 405, 505) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405, 505) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for a watercraft traversing a body of water, the system comprising:
    a housing configured to be mounted to the watercraft and be positioned within an underwater environment relative to the watercraft, the housing comprising:
        at least one transducer element configured to:
            transmit sound waves into the underwater environment of the body of water,
            receive sonar return signals from the body of water, and
            convert the sonar return signals into sonar return data; and
        at least one impact detection device configured to receive impact data corresponding to an impact on the housing; and
    a marine electronic device configured to be mounted to the watercraft, the marine electronic device comprising:
        a user interface comprising a display;
        a marine electronic device processor; and
        a memory including computer program code configured to, with the marine electronic device processor, cause the marine electronic device to:
            receive sonar return data from the at least one transducer element;
            generate one or more sonar images based on the sonar return data;
            receive impact data from the at least one impact detection device;
            determine, based on the impact data, an occurrence of an impact on the housing including the at least one transducer element;
            determine a location associated with the occurrence of the impact;
            generate, in response to determining the occurrence of the impact, one or more notifications indicating the occurrence of the impact; and
            cause indication of the location to be displayed on a navigational chart on the display of the user interface of the marine electronic device.

2. The system of claim 1, wherein the one or more notifications comprises an alert, light, buzzer, alarm, text, or a combination thereof.

3. The system of claim 1, wherein the one or more notifications comprises a quantitative indication of the impact.

4. The system of claim 1, wherein the memory and the computer program code are further configured to cause the marine electronic device to compare the impact data to a predetermined threshold and generate the one or more notifications in an instance in which the impact data meets or exceeds the predetermined threshold.

5. The system of claim 1, wherein the memory and the computer program code are further configured to cause the marine electronic device to determine the occurrence of the impact in an instance in which the impact exceeds a predetermined threshold.

6. The system of claim 1, wherein the impact detection device comprises an accelerometer.

7. The system of claim 6, wherein the accelerometer comprises a piezoelectric accelerometer, piezoresistive accelerometer, piezopolymer accelerometer, ultrasonic accelerometer, capacitive accelerometer, thermal accelerometer, or convective accelerometer.

8. The system of claim 6, wherein the accelerometer comprises a piezoelectric ceramic or a piezoelectric crystal device.

9. The system of claim 6, wherein the accelerometer comprises a single axis accelerometer, a multi-axis accelerometer, or a rotational accelerometer.

10. The system of claim 1, wherein the impact data comprises an output voltage or an electric charge, pulse, or signal.

11. The system of claim 1, wherein the housing is mounted to a boat or trolling motor.

12. A system comprising:
    a housing for mounting to a watercraft so as to be positioned within an underwater environment relative to the watercraft, the housing comprising:
        at least one transducer which comprises at least one piezoelectric element and is configured to:
            transmit sound waves into a body of water,
            receive sonar return signals from the body of water,
            vibrate in response to receipt of sonar return signals or an impact on the housing, and
            convert the vibrations into vibration data; and
    a marine electronic device for mounting to the watercraft, the marine electronic device comprising:
        a user interface comprising a display;
        a marine electronic device processor; and
        a memory including computer program code configured to, with the marine electronic device processor, cause the marine electronic device to:
            receive vibration data from the at least one transducer;
            generate one or more sonar images corresponding to the body of water relative to the watercraft and based on the vibration data from the piezoelectric element;
            determine, based on the vibration data from the piezoelectric element, an occurrence of an impact on the housing including the at least one transducer, wherein the vibration data used for determination of the occurrence of the impact and for generation of the one or more sonar images is from the same piezoelectric element;
            determine a location associated with the occurrence of the impact;

generate, in response to determining the occurrence of the impact, one or more notifications indicating the occurrence of the impact; and cause an indication of the location to be displayed on a navigational chart on the display of the user interface of the marine electronic device.

13. The system of claim 12, wherein the electronic device filters out any vibration data which corresponds to an impact on the housing prior to generation of the one or more sonar images.

14. The system of claim 12, wherein the one or more notifications comprises an alert, light, buzzer, alarm, text, or a combination thereof.

15. The system of claim 12, wherein the memory and the computer program code are further configured to cause the marine electronic device to compare the vibration data to a predetermined threshold and generate the one or more notifications in an instance in which the vibration data meets or exceeds the predetermined threshold.

16. The system of claim 12, wherein the vibration data is generated in response to sonar return signals and an impact on the housing.

17. A method for identifying object strikes to a sonar transducer system of a housing mounted to a watercraft and positioned within an underwater environment relative to the watercraft, wherein the method comprises:

receiving, by a processor, impact data from at least one impact detection device which is located adjacent the sonar transducer system, wherein the at least one impact detection device is configured to receive impact data corresponding to an impact on the housing;

determining, based on the impact data, an occurrence of an impact on the housing including the at least one transducer element by comparing the impact data to a predetermined threshold;

determining a location associated with the occurrence of the impact;

generating, in response to determining the occurrence of the impact, one or more notifications indicating the occurrence of the impact; and causing an indication of the location to be displayed on a navigational chart on a display of a user interface of a marine electronic device mounted to the watercraft.

* * * * *